No. 872,897. PATENTED DEC. 3, 1907.
J. W. CHAPMAN & C. C. FOSS.
NUT LOCK.
APPLICATION FILED AUG. 31, 1907.
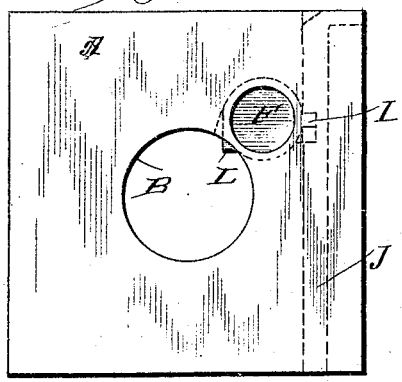
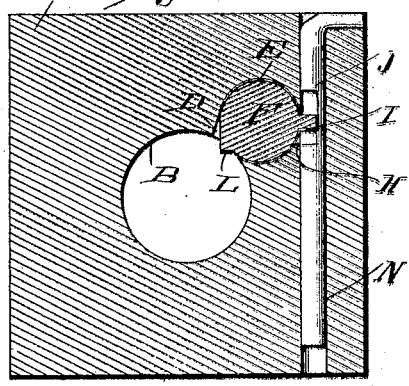
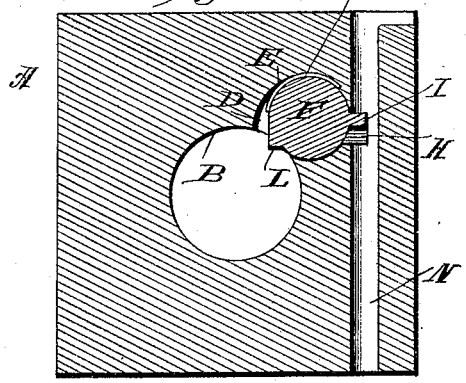
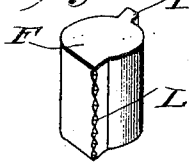
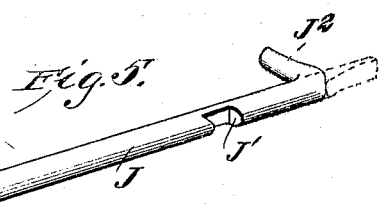
WITNESSES
E. M. Callaghan
Pervis B. Turpin
INVENTORS
JOHN W. CHAPMAN
CHRISTIAN C. FOSS
BY
Munn & Co.
ATTORNEYS.

UNITED STATES PATENT OFFICE.

JOHN W. CHAPMAN AND CHRISTIAN C. FOSS, OF BARWICK, GEORGIA.

NUT-LOCK.

No. 872,897.  Specification of Letters Patent.  Patented Dec. 3, 1907

Application filed August 31, 1907. Serial No. 390,937.

*To all whom it may concern:*

Be it known that we, JOHN W. CHAPMAN and CHRISTIAN C. FOSS, citizens of the United States, and residents of Barwick, in the county of Brooks and State of Georgia, have invented certain new and useful Improvements in Nut-Locks, of which the following is a specification.

This invention is an improvement in nut locks and consists in certain novel constructions and combinations of parts as will be hereinafter described and claimed.

In the drawings Figure 1 is a top plan view of a nut embodying the invention, the key being illustrated in position to lock the nut. Fig. 2 is a horizontal section drawn alongside the key and through the pawl. Fig. 3 is a detail sectional view illustrating the spring which is used in connection with the pawl on large nuts. Fig. 4 is a detail view of the pawl. Fig. 5 is a detail view of the key.

The nut A has a threaded bolt hole B and is provided at one side thereof with a pawl chamber D which has the curved walls E forming a bearing in which the pawl F may be turned and this pawl chamber communicates at one side with the bolt hole and is provided at the other side at its upper end with a lateral wing H in which operates the lateral tongue I at the upper end of the pawl for engagement by the key J presently described.

The pawl is provided opposite the tongue I with a pawl point L which in the locked position of the pawl protrudes into the bolt hole to engage the bolt. This pawl point may be a plain edge or may be serrated, as desired, and we have shown it serrated in Fig. 4 of the drawings.

In large nuts we may employ a spring M operating in a groove in the nut to press the pawl into position with its point protruding into the bolt hole. The key J is movable longitudinally in a channel N formed in the nut, and is provided between its ends with a notch J' receiving the tongue on the pawl so the movement of the key in a longitudinal direction may operate the pawl as desired. At one end the key is adapted to be bent at $J^2$ into a groove in the side of the nut to secure the key in position to hold the dog in engagement with the bolt. Manifestly however, the end $J^2$ may be released and the key operated to move the pawl clear of the bolt when the nut may be easily turned off the bolt.

It will be noticed that the pawl protrudes at its upper end slightly below the face of the nut and the latter is burred slightly from the pawl to retain the same.

It will be noticed that our invention is simple, permits the nut to be turned home, will hold the nut securely and can be released when desired to permit the nut to be turned off the bolt without any injury to the bolt; also the invention can be used on ordinary bolts involving no change in the structure of the bolt and the bolt will not be injured in the use of the invention.

As best shown in Figs. 2, 3 and 5, one end of the key is flattened at $J^2$ and will lie when bent to the position shown in Fig. 3, flush with the outer side of the nut, avoiding any projection beyond the face of the nut in the positions of parts shown in Figs. 2 and 3, the pin being also of such length that it will not protrude at either end beyond the nut in any position of the said key.

We claim—

1. The combination of a nut having a bolt hole and a chamber therein communicating with the bolt hole and having a lateral wing or extension, and also provided with a transverse channel communicating with said lateral wing or extension of the chamber or recess, a pawl rocking in the chamber or recess of the nut and having a pawl point arranged to be protruded into the bolt hole and provided with a tongue operating in the lateral extension of the chamber, or recess, and a key movable longitudinally in the transverse channel of the nut and having a notch receiving the tongue of the pawl and arranged at one end to be bent into engagement with the nut to secure the key in position, all substantially as and for the purpose set forth.

2. A nut having a rocking pawl, and a key movable transversely of the nut and engaged between its ends with the rocking pawl, and having one end made flat on one side adapted to be bent into engagement with a nut, the key having a slot cut long enough where it engages with the rocking pawl so that when it is driven forward, the flat end of the key will extend far enough beyond the nut to be bent along the nut whereby to hold the rocking pawl in place, substantially as set forth.

3. A nut having a bolt hole, and a chamber alongside the same and communicating with the bolt hole, a pawl rocking in the chamber and having at one side a pawl point which may be protruded into the bolt hole, and a transverse key engaged with the pawl at the side thereof opposite the pawl point, and projecting at its end beyond the nut whereby said end may be bent into engagement with the nut, substantially as and for the purpose set forth.

JOHN W. CHAPMAN.
CHRISTIAN C. FOSS.

Witnesses:
H. W. MASSEY,
J. W. MASSEY.